(12) United States Patent
Shilane et al.

(10) Patent No.: US 11,048,676 B2
(45) Date of Patent: *Jun. 29, 2021

(54) TREES AND GRAPHS IN FLASH MEMORY

(71) Applicant: EMC IP Holding Company LLC, Hopkinton, MA (US)

(72) Inventors: Philip N. Shilane, Newtown, PA (US); Grant R. Wallace, Pennington, NJ (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 150 days.

This patent is subject to a terminal disclaimer.

(21) Appl. No.: 16/356,545

(22) Filed: Mar. 18, 2019

(65) Prior Publication Data

US 2019/0213177 A1 Jul. 11, 2019

Related U.S. Application Data

(63) Continuation of application No. 15/281,394, filed on Sep. 30, 2016, now Pat. No. 10,235,397.

(51) Int. Cl.
G06F 17/00 (2019.01)
G06F 16/215 (2019.01)
G06F 3/06 (2006.01)
G06F 16/23 (2019.01)
G06F 16/22 (2019.01)
(Continued)

(52) U.S. Cl.
CPC .......... G06F 16/215 (2019.01); G06F 3/0604 (2013.01); G06F 3/064 (2013.01); G06F 3/0616 (2013.01); G06F 3/0638 (2013.01); G06F 3/0652 (2013.01); G06F 3/0679 (2013.01); G06F 16/2246 (2019.01); G06F 16/23 (2019.01); G06F 16/2365 (2019.01); G06F 16/24562 (2019.01); G06F 16/9027 (2019.01)

(58) Field of Classification Search
CPC .... G06F 16/215; G06F 16/9027; G06F 16/23; G06F 16/2246; G06F 16/2365; G06F 16/24562; G06F 3/0616; G06F 3/064; G06F 3/0638; G06F 3/0604; G06F 3/0652; G06F 3/0679
See application file for complete search history.

(56) References Cited

U.S. PATENT DOCUMENTS 9,792,069 B2* 10/2017 Knestele .............. G06F 3/0688
10,235,397 B1* 3/2019 Shilane ............... G06F 16/9027
10,261,704 B1* 4/2019 Shilane ................ G06F 3/0616
(Continued)

OTHER PUBLICATIONS

Rize Jin and Tae-Sun Chung, "Dynamic regulation of index implementation for flash memory storages," 2010 The 2nd International Conference on Computer and Automation Engineering (ICCAE), Singapore, pp. 325-328, doi: 10.1109/ICCAE.2010.5451529, Apr. 2010.*

(Continued)

Primary Examiner — Greta L Robinson
(74) Attorney, Agent, or Firm — Workman Nydegger

(57) ABSTRACT

Systems and methods for managing content in a flash memory. Data structures such as trees and graphs are implemented in a flash memory. Nodes or field nodes such as pointers or invalidation bits are updated using an overwrite operation where possible or by invalidating certain fields and temporarily storing changes in an in-memory table.

20 Claims, 14 Drawing Sheets

(51) Int. Cl.
*G06F 16/2455* (2019.01)
*G06F 16/901* (2019.01)

(56) References Cited

U.S. PATENT DOCUMENTS

| | | |
|---|---|---|
| 2001/0012222 A1 | 8/2001 | Terasaki |
| 2009/0271563 A1 | 10/2009 | Gopalan |
| 2013/0151752 A1 | 6/2013 | Hsiao |
| 2014/0129758 A1 | 5/2014 | Okada |
| 2014/0281121 A1 | 9/2014 | Karanncheti |
| 2016/0139624 A1 | 5/2016 | Orr |
| 2016/0162187 A1 | 6/2016 | Lee |
| 2017/0242790 A1 | 8/2017 | O'Krafka |

OTHER PUBLICATIONS

J. Ahn, D. Kang, D. Jung, J. Kim and S. Maeng, "µ*-Tree: An Ordered Index Structure for NAND Flash Memory with Adaptive Page Layout Scheme," in IEEE Transactions on Computers, vol. 62, No. 4, pp. 784-797, doi: 10.1109/TC.2012.20, Apr. 2013.*

* cited by examiner

TREES AND GRAPHS IN FLASH MEMORY

FIELD OF THE INVENTION

Embodiments of the invention relate to systems and methods for processing large datasets. More particularly, embodiments of the invention relate to data structures in flash memory and to systems and methods for implementing trees, graphs, and other data structures in flash memory.

BACKGROUND

As the amount of data in computing systems continues to increase, there is a strong desire for improvements that allow datasets to be efficiently processed. DRAM (Dynamic Random Access Memory) and the like are often too small to efficiently process large data sets. Algorithms that process data out-of-core (e.g., using Hard Disk Drives (HDDs)) tend to be slow.

One potential solution is to introduce flash memory into the computing systems. Flash memory is faster than HDDs and has the capacity to accelerate dataset analysis. Even though flash memory can improve the processing capability of the computing systems, flash memory has several problems that impact performance.

Conventional data structures are designed assuming that random changes or random edits can be performed quickly and without penalty. In contrast, there is a penalty associated with small edits or changes in a flash memory. Small edits in a flash memory require the entire edited page to be copied forward to a new page. The previous page must be eventually erased before it can be reused. More specifically, data in a used area or page of a conventional flash memory cannot be simply changed to a new value. Rather, it is necessary to erase the entire page before writing the data to the page. This is the reason that small edits to a page in the flash memory are performed by writing the data to a new page. It then becomes necessary to erase the old page.

This process causes both a performance penalty and a lifespan penalty. This process results in multiple reads and writes (thus the performance penalty). The lifespan penalty occurs because flash memory can only be written or erased a limited number of times before wearing out. Further, flash memory is typically erased in large units.

This creates additional problems when implementing data structures in the flash memory. Every time a change is made to data that is stored in the data structure, there is a potential for multiple writes and erasures. Systems and methods are needed to improve the performance of flash memory and to improve the lifespan of the flash memory and to effectively implement data structures in a flash memory.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
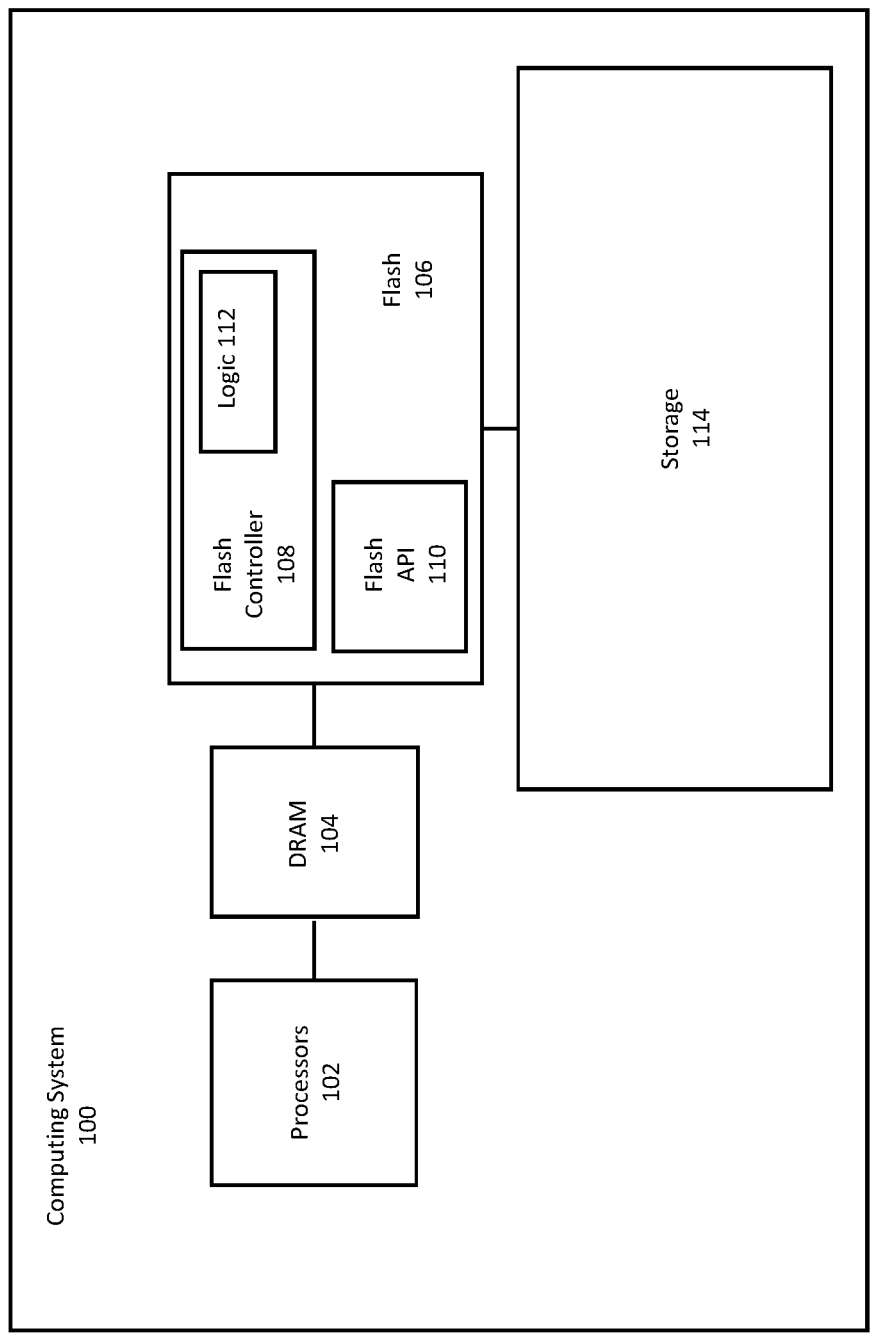
FIG. 1 illustrates an example of a computing system that is configured to perform overwrites in a flash memory.

Embodiments of the invention relate to systems and methods for processing large datasets. Embodiments of the invention further relate to systems and methods for processing large datasets in a flash memory (e.g., SSD (solid state drive)). Embodiments of the invention further relate to systems and methods for controlling or managing flash memory and to interfacing with flash memory. Embodiments of the invention further relate to data structures in a flash memory.

In a conventional flash memory, the ability to set a bit (i.e., change from a logical 0 to a logical 1) may be supported at the bit level. However, changing a bit from a logical 1 to a logical 0 (unset the bit) is not supported at this level (e.g., the bit level). Rather, it is necessary to erase a larger unit in the flash memory in order to unset bits. By way of example, flash memory may be erased in 1 megabyte units. As a result, it is not generally possible to overwrite existing data in flash with new data. Instead, new data is written to a new location (which may have been previously erased) and the old location is marked for erasure. Embodiments of the invention enable overwrites of existing data in some instances and in various data structures. Embodiments of the invention allow data structures to be implemented in flash while reducing the number of associated erasures by overwriting some of the data in the data structures.

A flash memory may include a controller and an interface (e.g., API (application programming interface) or other interface) associated with the flash memory controller. In one example, the logic of the flash memory controller is configured to perform writes to existing data (overwriting the existing data) rather than write the data to a new location and mark the old location for deletion. If necessary, the controller may cause the data to be simply written to a new location. For an overwrite operation, the controller may initially read the version of the page or block being written (i.e., the copy in the flash memory). If the changes being written only result in the setting of more logical is (e.g., changing 0s to 1s), then the existing page or block can be overwritten. If some bits need to be unset (changed from 1s to 0s) in the flash memory, then the write may be performed normally to a new page and the old page is marked for erasure. During this process (read-check-overwrite), the affected page or block may be locked.

In another example, an overwrite can be achieved using calls to a flash memory API. Calls include, by way of example, a logical-OR and a Compare-and-Swap.

During a logical-OR call, a client may provide a block of data and an address. The page (or pages depending on the size of the block of data) at that address is modified to the logical OR of its current contents with the provided block. This only requires setting additional bits. As a result, an overwrite may be performed on the current page or pages without the need to write to a new page or pages. The logical OR changes 0s in the target block that correspond to 1s in the new data to be set. It may not be necessary to perform an OR operation for each bit in the overwrite operation. It may only be necessary to identify the 0s that need to be changed to 1s.

An overwrite may occur in flash memory by performing a logical OR operation. This operation ensures that 1s located in a target block are unaffected while 0s are potentially changed to 1s. The change occurs when the data being overwritten to the target block contains a 1 where the target block contains a 0. A logical OR operation between bits A and B has the possible outcomes:

| A | B | OR Result |
|---|---|-----------|
| 0 | 0 | 0 |
| 0 | 1 | 1 |
| 1 | 0 | 1 |
| 1 | 1 | 1 |

A Compare-and-Swap call may be used for locking and thread synchronization when performing overwrites. In a compare-and-swap call, a client provides the new version of the block. Alternatively, the client may provide both the previous version of the block and the new version of the block. The flash memory, in response to the call, may atomically read the page or block and compare the read page/block with the previous version provided by the client. If the previous version provided by the client matches the page/block read from the flash memory, then the page/block is overwritten with the new version provided by the client in the call using, for example, a logical OR. Other compare-and-swap operations to the same page are blocked until the current call completes. The block of data may also be locked using a locking data structure.

Embodiments of the invention may implement data structures in the flash memory such that the data structure can be updated using overwrites. This prolongs the life of the flash memory by limiting or reducing the number of erasures and can improve the performance of the flash memory. Examples of data structures include, but are not limited to, bloom filters, linked lists, hash tables, locking data structures, trees, graphs, and the like or combinations thereof.

FIGS. 1-4 describe a flash memory and examples of logic and calls that may be used to perform an overwrite. FIG. 1 illustrates an example of a computing system that includes a flash memory and that enables pages to be overwritten from an internal perspective and an external perspective. Overwrites to existing pages (without erasing the data first) can be achieved using internal logic. An external interface, which provides access to an API, allows similar abilities to be invoked by a client. As discussed herein, changing a bit from 0 to 1 is setting a bit and changing a bit from 1 to 0 is unsetting a bit. Unsetting bits can typically only be performed by erasing an erasure unit at a time and an erasure unit may include multiple pages.

FIG. 1 illustrates a computing device or system 100 that includes processor(s) 102, DRAM 104, flash memory 106, and storage 114. The computing system 100 may be configured to provide computing services such as backup services, document management, contact management, or the like. The computing system 100 can be formed of network connected devices or may be implemented as an integrated device. The computing system 100 can be connected to a computing network.

The storage 114 may include various hardware storage devices (e.g., magnetic, optical, etc.) such as HDDs. The storage 114 can be arranged in different manners and may include multiple devices. The DRAM 104 and the flash 106 can be used as caches in the computing system 100. The DRAM, which is the fastest memory, is typically smaller than the flash memory 106. The flash memory 106 is typically smaller than the storage 114. In other embodiments, the flash 106 may be the primary storage and the storage 114 could be omitted. The flash memory 106 can be large (e.g., terabytes or larger). The computing system 100 may be configured for processing large data sets such as backup data, data lake data, or the like.

The flash memory 106 is associated with a flash controller 108 and a flash API 110. The flash controller 108 typically controls operations occurring within the flash 106 and may include its own processor and memory and other circuitry. The flash API 110 allows clients to make specific calls to the flash memory 106, which may be executed by the flash controller 108. The client may be any device or component (e.g., processor, memory controller, process) that interacts with the flash memory 106.

The flash controller 108 is associated with logic 112 that may be configured to interact with or perform operations on the data stored in the flash memory 106. The logic 112, for example, may perform overwrites, reads, moves, copies, inserts, logical-ORs, compare-and-swaps, erasures, or the like.

Figure 2:
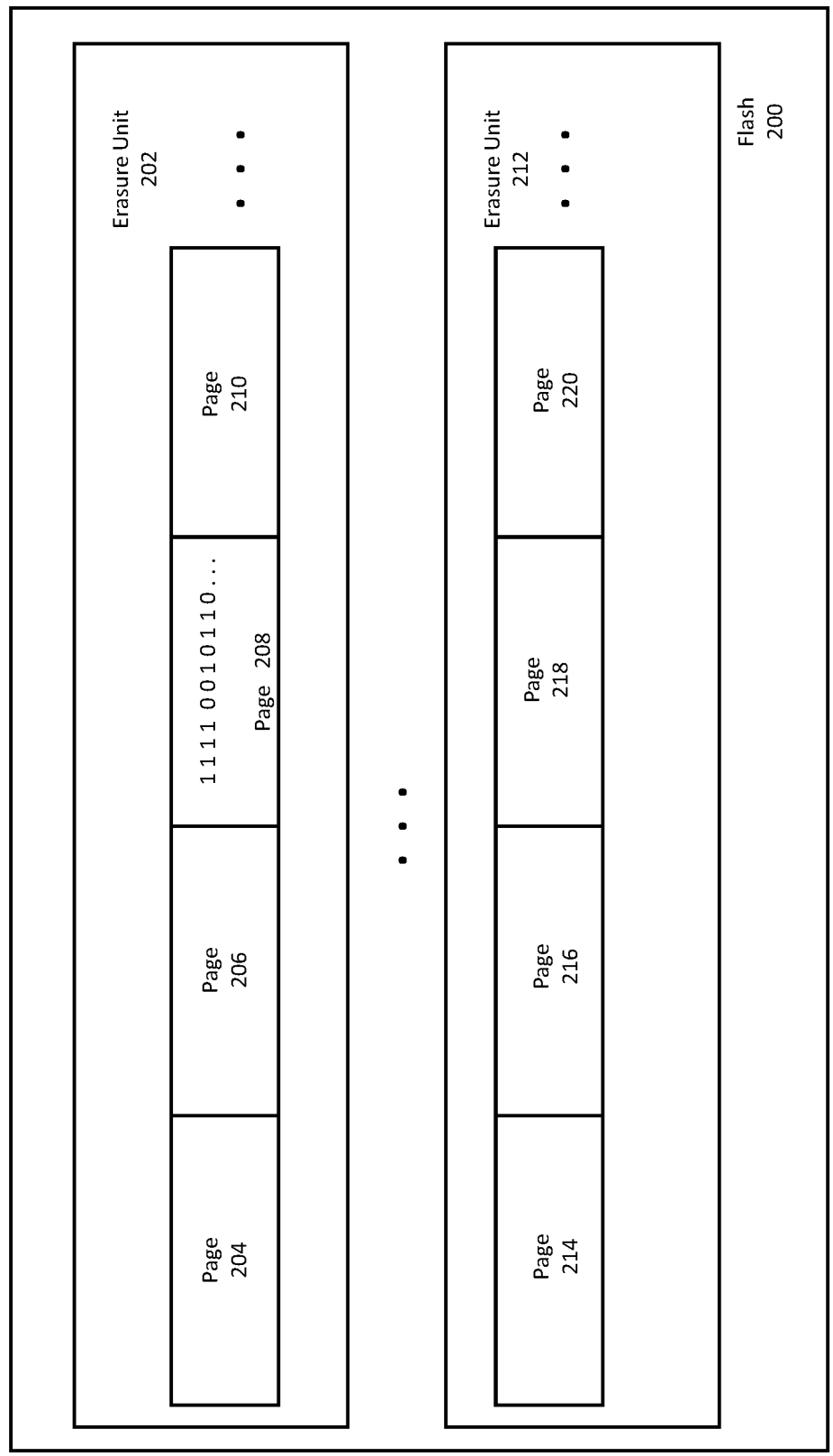
FIG. 2 illustrates an example of a flash memory that is configured to perform overwrites.

FIG. 2 illustrates an example of a flash memory and illustrates how data may be arranged in the flash memory. FIG. 2 illustrates a flash memory 200, which is an example of the flash memory 106 shown in FIG. 1. The flash memory 200 includes erasure units, such as erasure units 202 and 212. Each erasure unit is associated with pages. Pages 204, 206, 208, and 210 are associated with the erasure unit 202 and the pages 214, 216, 218, and 220 are associated with the erasure unit 212. One of skill in the art can appreciate that the flash memory is typically much larger than illustrated. Further, the size of the erasure unit 212 can be set by default or may be changed.

The pages 204, 206, 208, and 210 are smaller than the erasure unit 202. By way of example only, the pages 204, 206, 208, and 210 may be 4 KB each. The erasure units 202 and 212 may be 1 MB each. Data stored in the flash memory 200 may also be arranged in containers or using other storage arrangements. However, when data is written to the flash memory 200, the data is written in pages and the pages are usually written in sequence in some embodiments. Other memory configurations are within the scope of embodiments of the invention.

In order to overwrite a page in a conventional flash, it is necessary to erase all pages in the erasure unit before writing the pages in the newly erased erasure unit or write the new page to a new location. For example, the page 208 includes data. Because the page 208 contains data, a conventional flash cannot simply write new data to the page 208. Rather, it is necessary to erase all pages 204, 206, 208, and 210 in the erasure unit 202 before new data can be written to the page 208. Thus, all pages in the erasure unit 202 would be erased. The new data could alternatively be written to a new location and the existing page or erasure unit marked for erasure.

Embodiments of the invention, in contrast, allow data to be written to the page 208 by performing an overwrite operation. In particular, embodiments of the invention allow data to be written to the page 208 or any other page in the erasure unit 202 (or more generally in the flash memory) as long as the write makes no changes that cause specific cells (or bits) to become unset, but only changes 0s to 1s. This is because the flash memory 200 may allow more electrons to be stored in an individual cell (representing one bit) thus semantically changing the value from 0 to 1. Reducing the electrons to change a 1 to a 0, however, involves erasing an entire erasure unit due to the hardware constraints. Thus, data such as 0000 can be overwritten to become 0101 because only 0s are being changed to 1s. An overwrite is not permitted when attempting to change 1110 to 0010 because this involves changing 1s to 0s which is not possible for this type of flash memory. In this case when changing 1s to 0s, it may be necessary to follow conventional flash memory writing procedures, which may involve writing the data to a new page and erasing the pages in the erasure unit.

Figure 3:
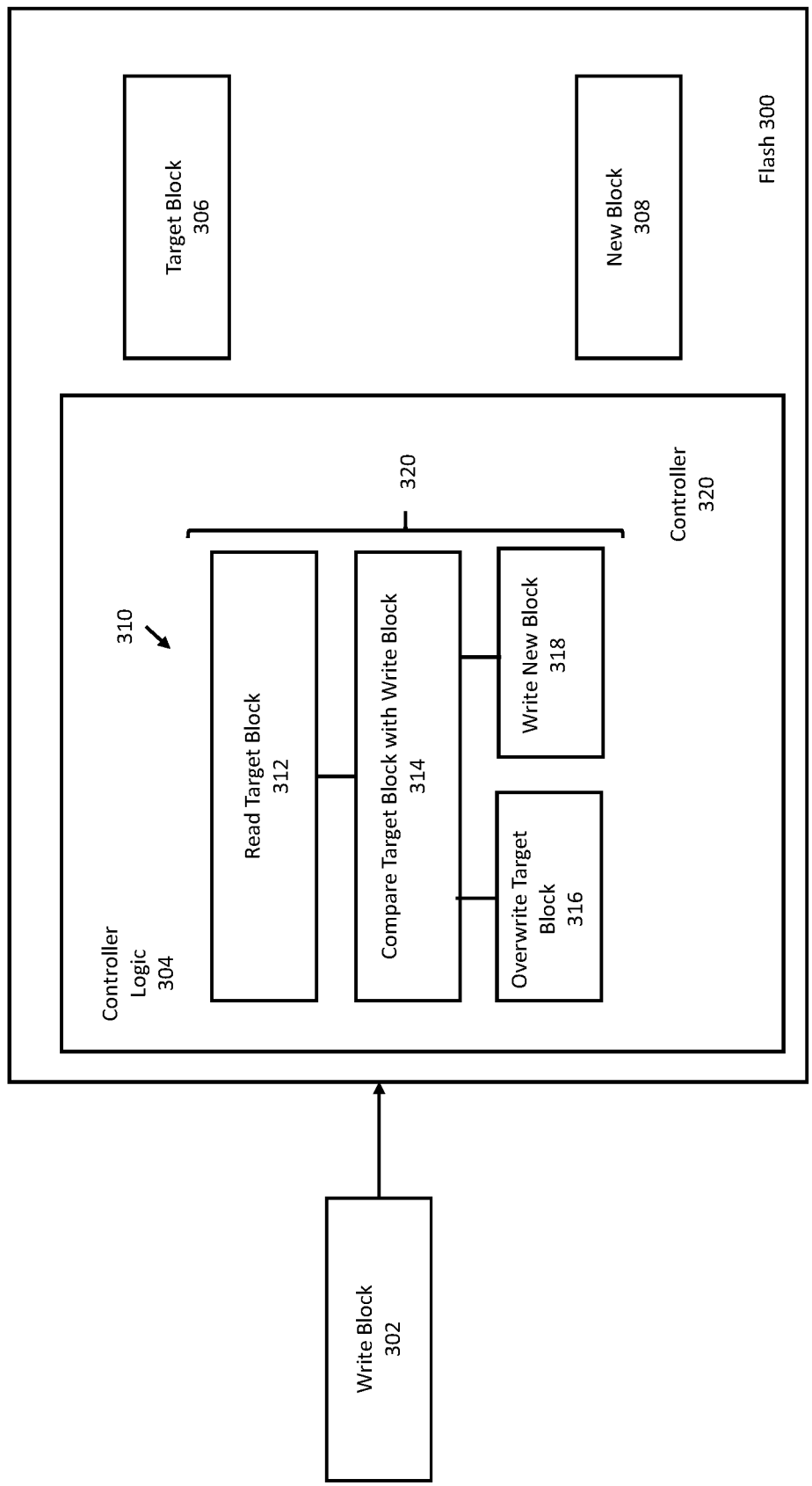
FIG. 3 illustrates an example of internal logic for overwriting portions of a flash memory.

FIG. 3 illustrates an example of a flash memory that includes a controller and illustrates an example of logic associated with performing an overwrite in the flash memory. FIG. 3 illustrates that the flash memory 300 may receive a write block 302 from a client (e.g., a thread, process, or the like). When the write block 302 is received, the controller may perform controller logic 304 to perform the write operation in the flash memory 300.

The write operation may include performing a method 310. The write block 302 may write to or correspond to more than one page in the flash memory 300. In box 312, the controller 320 may read the target block 306. The target block 306 may be, by way of example, a previous version of the write block 302. The target block 306 may be located at a destination address included in the write request received along with the write block 302.

After reading the target block 306, the controller 320 may compare the target block 306 with the write block 302. The result of the comparison determines, in one example, whether the target block 306 can be overwritten with the write block 302 or whether the write block is written to a new location as the new block 308. The comparison may identify which bits need to be changed from 0s to 1s.

In one example, if the comparison in box 314 determines that writing the write block 302 to the target block 306 would only set bits from 0s to 1s, then the target block 306 is overwritten with the write block 302 in box 316. If the comparison determines that it is necessary to reset 1s to 0s, then the write block 302 is written to a new location as the new block 308 in box 318. The target block 306 may be marked for deletion or erasure.

The logic performed in the method 310 is internal to the flash memory 300 in this example. The client associated with the write operation may not be aware of the overwrite method performed in the flash memory 300.

During the method 310 and in particular while reading the target block, comparing the target block with the write block and overwriting the target block, the page or pages associated with the target block are locked at 320 so that another client does not interfere with the method 310. A lock may be used during the overwrite method 310. The controller 320 may set aside some memory to track which regions of the flash memory 300 are locked.

Figure 4:
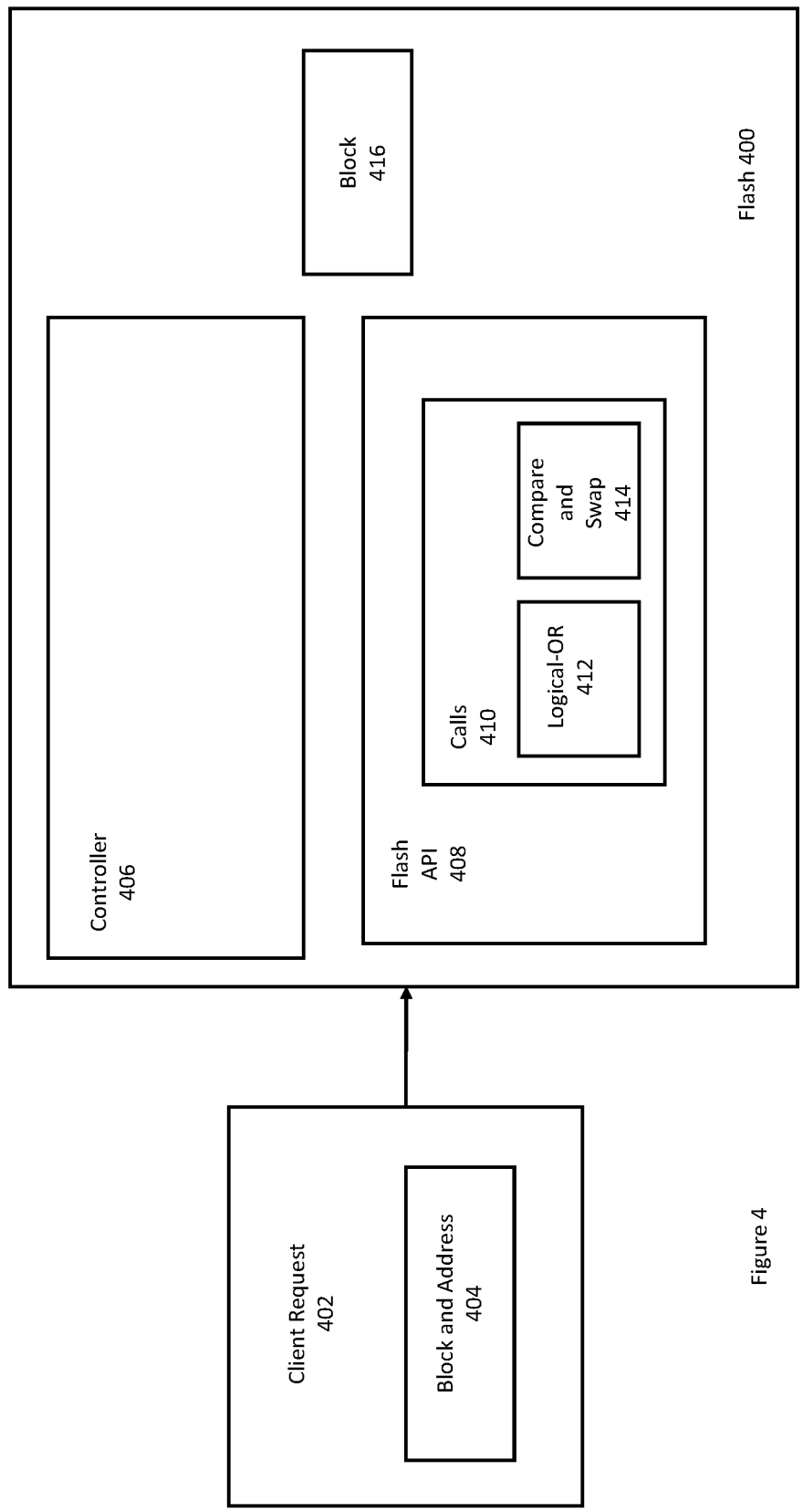
FIG. 4 illustrates an example of an external interface for overwriting portions of a flash memory and for locking portions of the flash memory when performing overwrites.

FIG. 4 illustrates an example of an external interface for overwrites in a flash memory. FIG. 4 illustrates a flash memory 400, which is an example of the flash memory 106 in FIG. 1. The flash memory 400 includes a controller 406 and an API 408. The API 408 includes calls 410 including, by way of example, a logical-OR 412 and a Compare and Swap 414.

In contrast to the internal logic illustrated in FIG. 3 (embodiments of the invention may include both internal logic and the external interface), the API allows a client to explicitly call the API 408. The logical-OR call 412 allows a client 402 to provide a block of data and an address 404. A logical OR is performed between the page or pages at the address provided in the client request 402 with the block 416 at the specified address. This call compares or performs a logical OR with each respective bit. A logical OR has the property that it never changes a one to a zero, but zeros may be changed to one if they are ORed with a one. This operation is an overwrite that potentially replaces 0s in the block 416 to 1s. The client may be aware, prior to making the call, that the necessary updates to the block 416 can be achieved with the logical OR operation. Depending on hardware capabilities, a logical OR operation may not be required for each bit. Rather, the logical OR effectively changes 0s in to the block 416 to 1s based on the contents of the block provided in the client request 402. Thus, the logical OR may simply identify the bits to be changed to 1s and make those changes. If the hardware is configured such that an entire page is written at a time, then the page is written such that the relevant 0s are changed to 1s.

The compare and swap call 414 can be used for locking and/or for thread synchronization when performing overwrites and/or for performing overwrites without locking. When making a compare and swap call 414, the client may provide a previous version of a block and a new version of the block. The new version may have new bits set. The controller 406 may then compare the previous version included in the request with the block 416 to insure that another client has not changed the block. If the comparison between the previous version included in the request and the block is equal or if the comparison only results in setting 0s to 1s, the block 416 can be overwritten (e.g., by using logical-OR operation) with the new version included in the client request 402. Other callers attempting to impact or alter block 416 will be blocked until these compare and swap operation completes. Thus, the controller 406 may also lock locations in the flash memory 400 that are being updated or changed in accordance with the controller logic or API calls 410. A compare and swap operation may thus use a locking data structure.

The calls and logic discussed herein may be implemented with computer executable instructions and the controller 406 and/or the flash memory 400 are examples of a computing device. The calls and logic discussed herein may also be used when interacting (e.g., read/write/update) with data structures implemented in a flash memory.

A tree is a data structure that is often used, by way of example, to represent a sorted set of data, to represent hierarchical data, to store data in a searchable manner, or the like. A tree is generally a collection of nodes where each node may store data and is linked to certain other nodes. Each node may also include another data structure of a different type. For example, each node may be a linked list, an array, a table, or the like. Embodiments of the invention include data structures embedded within data structures.

The nodes in a tree may be referred to by various names that may depend on their location in the tree. A root node is usually the top or beginning node of the tree. A child node is a node that is connected to a parent node. The parent node is closer to the root node that its child node. The parent node typically points to a child node and a child node may reference its parent node. Sibling nodes are nodes that have the same parent node. A leaf node is a node with no children. A node may have one or more children nodes.

The nodes in a tree may also include pointers or references to other nodes in the tree. For example, a parent node may include a pointer to each of its children nodes. In some examples, the same parent node may include data or a data pointer that points to the data of the node or to another data structure. When nodes in a tree data structure are added, removed, or edited, embodiments of the invention overwrite existing pointers or data when possible. For example, if a change to the node can be effected by only changing 0s to 1s, then the change may be made performing an overwrite operation. Alternatively, the writes are temporarily stored in a table in memory (e.g., DRAM) until a time during which all changes stored in the table are written to the tree. For example, changing a pointer in a node can be achieved by overwriting the existing pointer or storing the new pointer in an in-memory table until a time when the new pointer is actually written out. In this instance, the existing pointer in the node may be marked as invalid using an invalid bit.

Figure 5A:
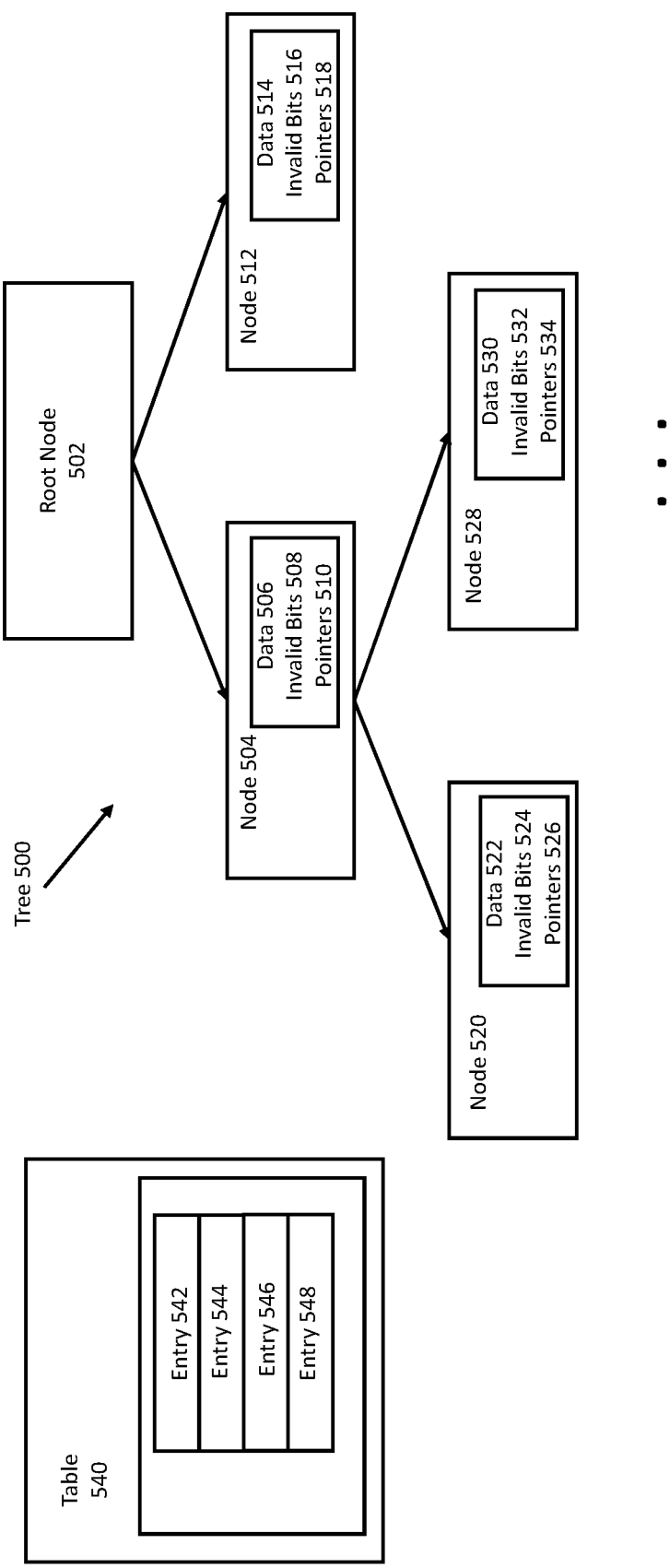
FIG. 5A illustrates an example of a tree data structure implemented in a flash memory.

FIG. 5A illustrates an example of a tree 500 that may be implemented in a flash memory. The tree 500 includes a root node 502. The nodes 504 and 512 are children nodes of the root node 502. The nodes 520 and 528 are children nodes of the node 504. The nodes 512, 520 and 528 are also leaf nodes.

In this example, the node 504 is associated with data 506, invalid bits 508 and pointers 510. In this example, the pointers 510 include a child pointer to the node 520 and a child pointer to the node 528. The pointers 510 may also include a parent pointer to the node 502. The other nodes are similarly configured. The node 512 is associated with data 514, invalid bits 516 and pointers 518. The node 520 is associated with data 522, invalid bits 524, and pointers 526. The node 528 is associated with data 530, invalid bits 532 and pointers 534. The root node 502 may also include data, invalid bits and pointers.

The tree 500 is also associated with a table 540 (e.g., hash table or other in memory structure) that is in stored in memory such as DRAM. The table 540 stores entries such as entries 542, 544, 546 and 548. The entries may include pointers and each entry may be associated with a specific node in the tree 500. By temporarily storing pointers in the table 540, the tree 500 can still be traversed or changed and the relationships between nodes can be preserved. When an invalid node or pointer is found in the tree, the table 540 may be consulted to identify the location of the next node. At certain times (e.g., periodically or by command), the table 540 is flushed to the flash memory and the tree 500 or portion thereof is revised to incorporate the changes reflected in the table 540. This may involve multiple write operations.

Figure 5B:
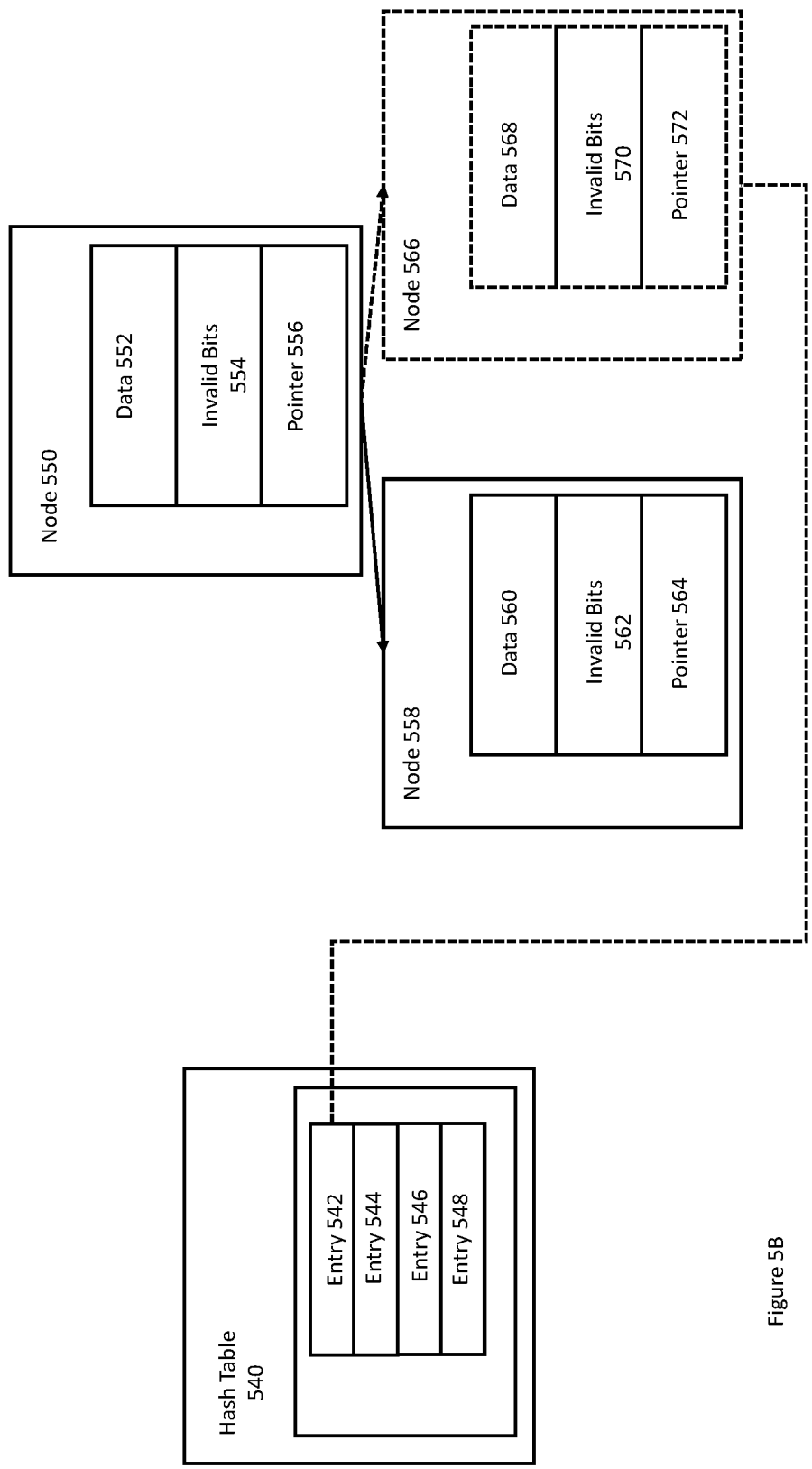
FIG. 5B illustrates another example of a tree data structure implemented in a flash memory

FIG. 5B illustrates a portion of the tree 500 and is used to illustrate various examples of making changes or edits to the tree 500, which is implemented in a flash memory. Changes may include adding a node, removing a node, editing a node, or the like. In general, when the tree 500 is initialized or when a node is added to the tree 500, the data of the node may be written to the node at the time of creation. At the same time, the invalid bits and the pointers may be all zeros. However, if the node includes a parent pointer, the parent pointer may be written to the node because the parent node exists in the tree. A child pointer may also be added to the parent node.

In one example, a child node is added to a leaf node. For example, the node 550 may be a leaf node and the node 558 is being newly added to the tree 500 to be a child node of the node 550. As previously stated, when the node 550 was initially created, space may have been allocated for the data 552, the invalid bits 554 and the pointer 556. The invalid bits 554 and the pointer 556 contain all zeros or mostly zeros initially.

Because the invalid bit 554 and the pointer 556 contain all zeros, changes can be made to these values by overwriting the values, for example, using a logical OR or a compare-and-swap operation. In one example, the pointer 556 may include space for a fixed number of pointers, all of which initially contain all zeros. This allows multiple children nodes to be connected to the node 550 without having to rewrite the node 550. Alternatively, the pointer 556 may initially contain space for a single pointer and pointers to additional children nodes may be stored in the table 540 if there is no room in the node. At a later time, the hash table 540 is written to the flash memory and the tree 500 is rewritten as necessary to incorporate the changes referenced in the table 540.

When the node 558 is added as a child node to the node 550, the pointer 556 in the node 550 is overwritten with a pointer to the node 558. The invalid bits 562 and the pointer 564 or the new child node 558, however, are zeros.

In another example, the invalid bits 554 allow data and/or pointers in the node 550 to be invalidated or marked as invalid. The invalid bits 554 may be an array of zeros initially and each entry is associated with a specific part of the node. Entries in the invalid bits 554 may be associated with the data 552 and the pointer 556 (or pointers). By setting (changing from a 0 to a 1) the appropriate bit in the invalid bits 554, the data 552 and/or the pointer 556 can be invalidated. This allows the data 552 to be invalidated while allowing the pointer 556 to be valid. Alternatively, the data 552 can remain valid while the pointer 556 is invalidated. Alternatively, both the data 552 and the pointer 556 can be invalidated. When traversing the tree 500, the invalid bits 554 are evaluated to determine whether the pointer 556 and/or the data 552 is valid. Further, this allows the process to check the table 540 for any new entries associated with the node if an invalid bit indicates that a pointer or data is not valid.

When an invalid bit 554 indicates that, for example, the pointer 556 is invalid, the entries in the table 540 may include a valid pointer. This may occur, for example, when a child node is deleted or when a child node is added. Similarly, when the data is invalid, one of the entries in the table 540 may point to or store the new data. Thus, one or more entries in the table 540 may be associated with the node 550. Other entries in the table 540 may be associated with other nodes in the tree 500.

As more children are added to the node 550, other pointers in the pointers 556 may be overwritten (e.g., if the node is allocated with multiple pointers and they are currently zeros or have a value that can be overwritten) with the appropriate pointer values. Alternatively, the pointers to new or additional children nodes may be maintained in the table 540.

In another example, assuming that the nodes 550 and the node 558 are already in the tree, the node 558 may be deleted. When the node 558 is deleted, the appropriate pointer 556 in the node 550 is invalidated by changing a 0 in the invalid bits 554 to a 1. More specifically, the invalid bit corresponding to the child pointer to the node 558 in the pointers 556 of the node 550 is set to 1. This can be achieved by performing an overwriting operation that sets the 0 to a 1 in the invalid bits 554. A traversal of the tree 500 would then recognize that the node 558 is invalid when the invalid bits 554 are examined. Alternatively, all bits in the pointer 556 could be set to 1 to indicate that the pointer 556 is invalid. In this case, a corresponding invalid bit would not be required.

In another example when the node 558 also has a child node and the node 558 is deleted, the data 560 may be marked as invalid by setting the appropriate bit in the invalid bits 562. In this example, the child pointer to the node 558 in the pointers 556 remains valid. The child pointer in the pointer 564 also remains valid. This allows the children of the node 558 to be found even when the node 558 is invalid or deleted. In effect, this causes the child of the node 558 to become the child node of the node 550.

In another example, if the node 558 is being deleted and a node 566 is being inserted to take the place of the node 558, the pointers in the affected nodes are updated as necessary. More specifically in this example, the child pointer 556 in the node 550 is invalidated by setting an appropriate bit in the invalid bits or by setting all of the bits in the child pointer 556 to 1s. The entry 542 is amended such that the node 550 is associated with a child pointer to the node 566. In other word, the entry 542 includes a child pointer of the node 550. The pointers 572 of the new node 566 may be overwritten to point to any children of the node 566. However, if the node 566 is intended to replace the node 558, the pointer 572 may be overwritten to include the contents of the pointer 564. The node 566 may also include a parent pointer that points back to the node 550. Finally, the data 560 and pointers 564 may be invalidated. Alternatively, since there is no longer a pointer to the node 558 because the node 558 has been deleted or replaced by the node 566, the node 558 may be marked for erasure.

When the table 540 is flushed to the flash memory, portions of the tree 500 affected by the changes in the table 540 are implemented. More specifically, they may be written to a new location in the flash and the old portion of the tree is marked for erasure. This allows all nodes, data and pointers to be rewritten in new locations in one example. In one example, when the table 540 is written to the flash, it may only be necessary to rewrite a part of the tree 500.

For example, if the table 540 affects node 558 and all children of the node 558, only this portion of the tree 500 needs to be rewritten. This may require, however, that the pointer 556 to the node 558 be invalidated and an entry be made in the table 540 that points to the node 558 because the node 558 will be written to a new location in the flash memory. The old nodes may be marked for erasure.

Figure 6:
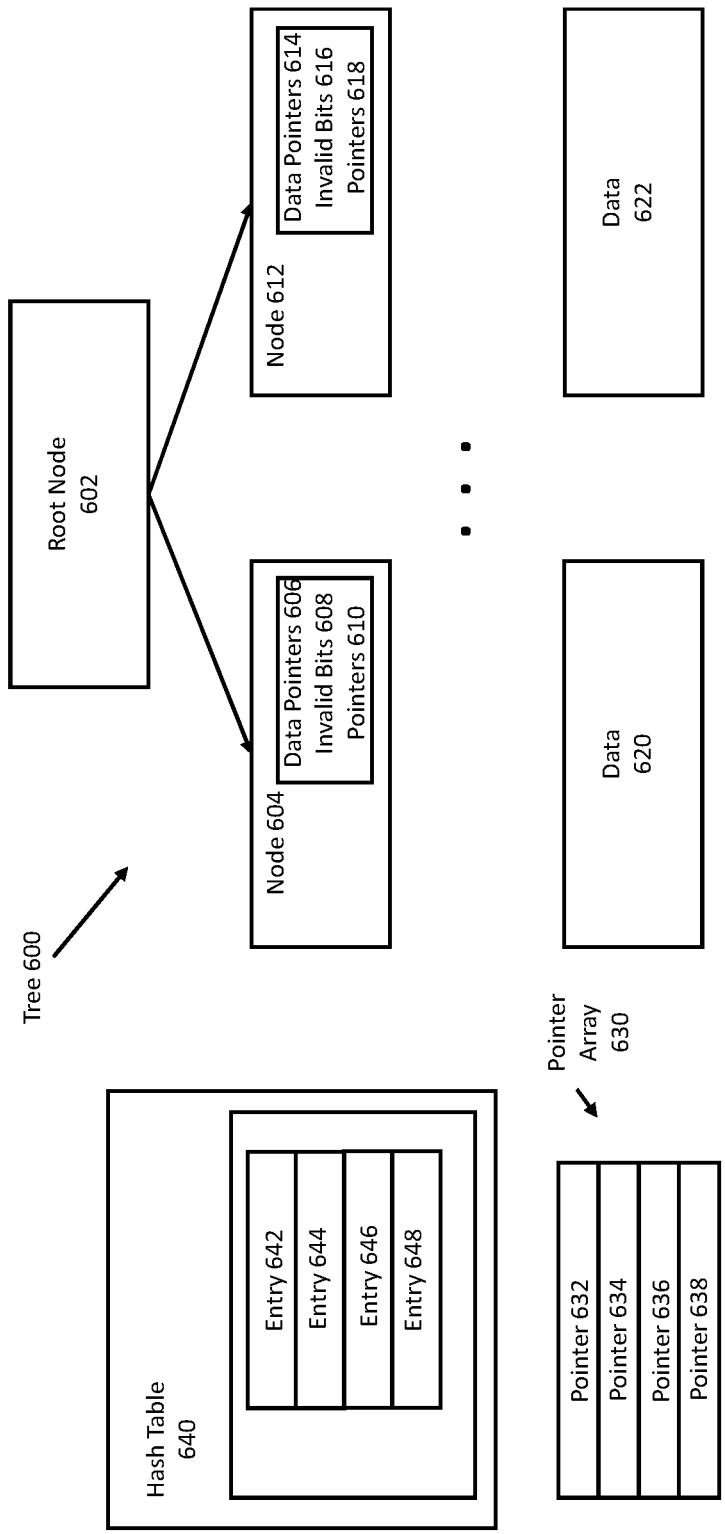
FIG. 6 illustrates another example of a tree data structure implemented in a flash memory.

FIG. 6 illustrates another example of a tree 600. In this example, the tree 600 includes a root node 602 and nodes 604 and node 612. The node 604 is associated with data pointers 606 (or a single data pointer), invalid bits 608 and pointers 610. The node 612 is associated with data pointers 614, invalid bits 616 and pointers 618. The difference between the tree 600 and the tree 500 is that the nodes in the tree 600 include data pointers. The data pointers 606 point to the data 620 while the data pointers 614 point to the data 622.

As a result, when new data is written to a node or to a new location in the flash memory, the corresponding data pointer can be invalidated by setting the corresponding invalid bit or by setting all bits in the corresponding data pointer to 1s. The new pointer to the new data can be written to an entry (e.g., entry 642) of the table 640.

In another example, the data pointers 606 may include an array of pointers. FIG. 6 illustrates an example of a pointer array 630 that includes multiple pointers 632, 634, 636 and 638. The pointer array 630 could include fewer or more pointers. The pointers to other nodes such as the pointers 610 and 618 or as otherwise discussed herein could also be implemented as an array of pointers. Each of the pointers 632, 634, 636, 638 may be associated with an invalidation bit.

In this example, the pointer 632 may initially point to the data 620. The bits in the pointers 634, 636, and 638 are initially zeros. When the data 620 is invalidated, the pointer 632 is also invalidated by setting the appropriate invalidation bit or by setting all bits in the pointer 632 to 1s. Rather than write a new pointer to the new data in the table 640, the pointer 634 may be overwritten with the new pointer. This allows the data to be changed or invalidated several times before using the hash table. In a similar manner, the pointers to other nodes can be implemented using a pointer array. In one example, the pointer array could be a mixed array and store pointers to both data and other nodes Embodiments of the invention thus relate to a tree (or other data structure) where overwrites can be performed instead of immediately writing the data to a new location and marking the old data for erasure. For example, pointers that are all 0s (e.g., the child pointer of a leaf node) can be overwritten with a pointer value when a child node is added to the leaf node. An array of invalid bits can be used to mark pointers or data as invalid. A table in the memory may be used temporarily to store new pointer values, data pointers, data values, or the like until a time when the entries in the table are written to the flash memory.

In general, all data or pointers affected by an operation on the data structure are overwritten where possible or marked as invalid. When entries are marked as invalid, entries are added to an in memory table when necessary. Alternatively, the new pointers could be added to spaces in a pointer array if spaces are available. Changes to a specific node may affect pointers in parent nodes and/or children nodes.

Embodiments of the invention may be particularly suited to trees that are too large for DRAM and that may change slowly. Nodes with data can be invalidated by setting an invalid bit. At the same time, links or pointers to children nodes can remain valid. Children nodes can be added to leaf nodes immediately because the pointer of the leaf node can be overwritten with the pointer to the new child node.

Embodiments of the invention further relate to graphs. A graph is similar to a tree in the sense that the graph may also include nodes. The nodes of a graph can be connected in different manners. Further, the connections between nodes may go in both directions and nodes may have more than one connection. However, nodes in a graph are typically connected and the connections can go in multiple directions. For ease of discussion, connected nodes of a graph are discussed as having a parent/child relationship. Which node is the parent and which node is the child may depend on context and on the relationship connecting the two nodes. However, a graph may include loops and may include relationships between nodes that are not present in a tree. The connections between nodes in a graph are often referred to as edges. The edges typically define a relationship between the nodes. As a result, two nodes in a graph may have more than one edge or more than one connection— each reflecting a different relationship. For example, a graph may be used to represent flight paths. If nodes represent two cities, there may be multiple edges that define flight time, fuel used, airline, airport, or the like.

When implementing a graph in a flash memory, however, many of the methods discussed previously relating to trees apply to graphs. Thus, the nodes and/or the edges generally include data, invalidation bits, and pointers. The data and/or pointers associated with the nodes and/or associated with edges can be invalidated or changed as previously discussed. More specifically, edges can contain data, such as a weight or other value and the data and/or pointers of edges can be changed or invalidated like the data and/or pointers of a node in a data structure. An in-memory table may also be used to temporarily store changes made to the nodes or edges of a graph.

Figure 7:
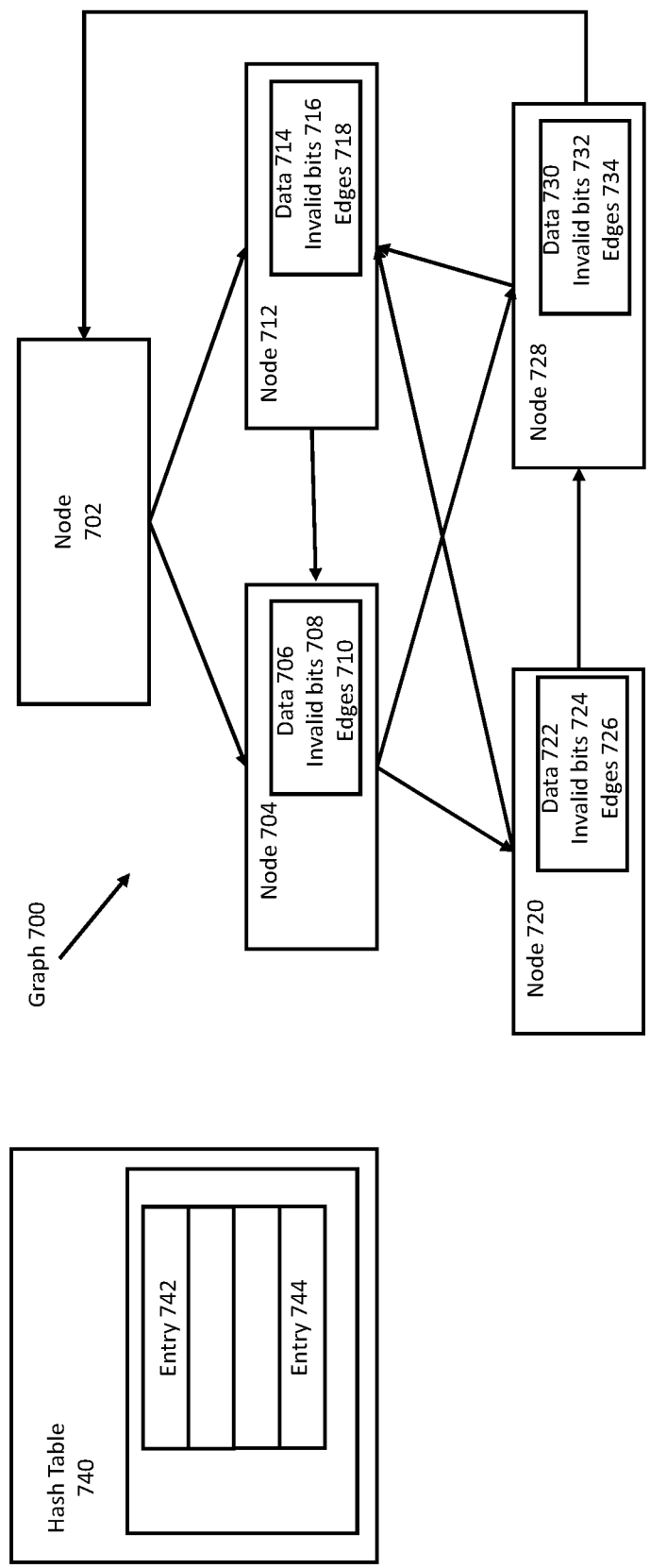
FIG. 7 illustrates an example of a graph data structure implemented in a flash memory.

FIG. 7 illustrates an example of a graph 700. The graph 700 includes nodes 702, 704, 712, 720 and 728. The arrows represent edges or relationships. The graph 700 thus illustrates that the node 704 is associated with data 706, invalid bits 708 and edges 710. The node 720 is associated with data 722, invalid bits 724, and edges 726. The node 712 is associated with data 714, invalid bits 716 and edges 718. The node 728 is associated with data 730, invalid bits 732, and edges 734. The node 702 is similarly configured. In one example, each arrow leaving or entering a node is an example of an edge.

Figure 9:
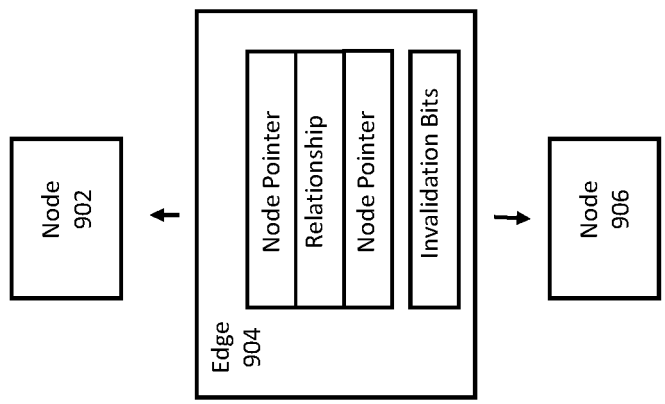
FIG. 9 illustrates another example of a node in a graph data structure.
Figure 8:
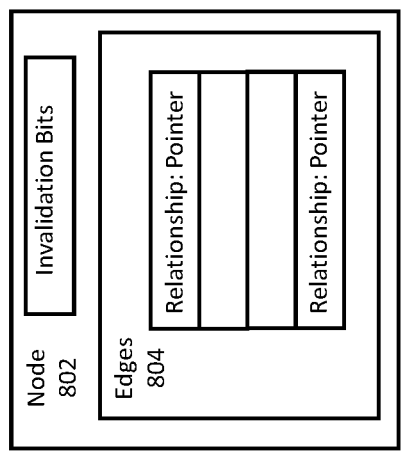
FIG. 8 illustrates an example of a node in a graph data structure.

FIG. 8 illustrates an example of a node in a graph. FIG. 8 illustrates that the edges 804 can be part of the node 802. In this example, each of the edges 804 may include a relationship and a pointer to another node (e.g., a child node with respect to that node). FIG. 9 illustrates that the edges 904 may be stored separately from the nodes 902. In this example, the edge 904 may include a node pointer to the node 902 and a node pointer to the node 906. The edge 904 may also identify the relationship between the node 902 and the node 906. The edge 904 may also contain a data component that may be associated with an invalidation bit. As previously discussed, data, pointers, or other fields can be invalidated by setting a corresponding invalidation bit or by setting all bits in the entry or field to 1s.

Invalidation bits can be added to or associated with nodes and/or the edges. Invalidation bits can be used to invalidate the data, the edge, and/or pointers. FIG. 8 illustrates invalidation bits that are part of the node 802 while FIG. 9 illustrates invalidation bits that are included in the edge 904. In FIG. 9, the nodes 902 and 906 may also include pointers and/or invalidation bits. For example, the nodes 902 and 906 may include pointers to their associated edges.

A new node in the graph 700 may be created in a manner similar to the creation of a node in a tree. More specifically, the node is added as a child node (a connected node) to at least one other node in the graph. A new node may be associated with multiple nodes when created. When adding a new node to the graph, the pointers of the parent (or connected) node or of the parent (or connected) nodes of the newly added node are updated. If the pointers of the parent nodes to the new node are zeros, then the pointer values may be overwritten with the pointer to the newly added node. If there is no space for the new pointer or if the pointers of the parent (or connected) nodes cannot be overwritten, then the pointer may be added as an entry (e.g., entry 742) in the table 740 and an invalidation bit may be set if a pointer is being replaced. Alternatively, bits may be used to indicate that the node has a new child or a new connected node whose pointer is stored in the table 740. An entry may be made in the table 740 for each connected node.

The pointers or data or edges in the graph 700 are changed like the pointers and data in the trees previously discussed. When a node of the graph 700 is edited, the pointers of all affected nodes and/or edges are changed as necessary.

For example, when a node of a graph is deleted, all relevant pointers in the connected nodes or edges may be invalidated. Alternatively, data of the node is invalidated while allowing all pointers to remain valid. This may facilitate traversal of the graph by allowing the node to be traversed such that the next node or such that all connected nodes can be identified. Alternatively, when a node is deleted, the pointers in the connected nodes are invalidated or overwritten with a pointer to a different node. More specifically, when a node is deleted, some of the pointers of the connected nodes may be invalidated or overwritten while other pointers may not be invalidated or written. The pointers overwritten or invalidated may depend on the relationship between the connected nodes. More specifically, this may take into account the relationships of the edges.

For example, consider three nodes that are connected in series. The first node is connected to a middle node and the middle node is connected to the third node. When the middle node is deleted, the pointers in the first node are changed or overwritten as necessary. In one example, the pointers in the first node may be overwritten or changes to point to the third node. The pointers of the third node, which is also a connected to the middle node may not need to be changed or overwritten. Of course, there may be one pointer in the third node to the middle node that is changed or overwritten. Thus, pointers are invalidated and the new pointers are inserted into the in-memory table such that the first node effectively points to the third node. The pointers added to the in-memory table may depend on or account for the edge type or relationship.

Figure 10:
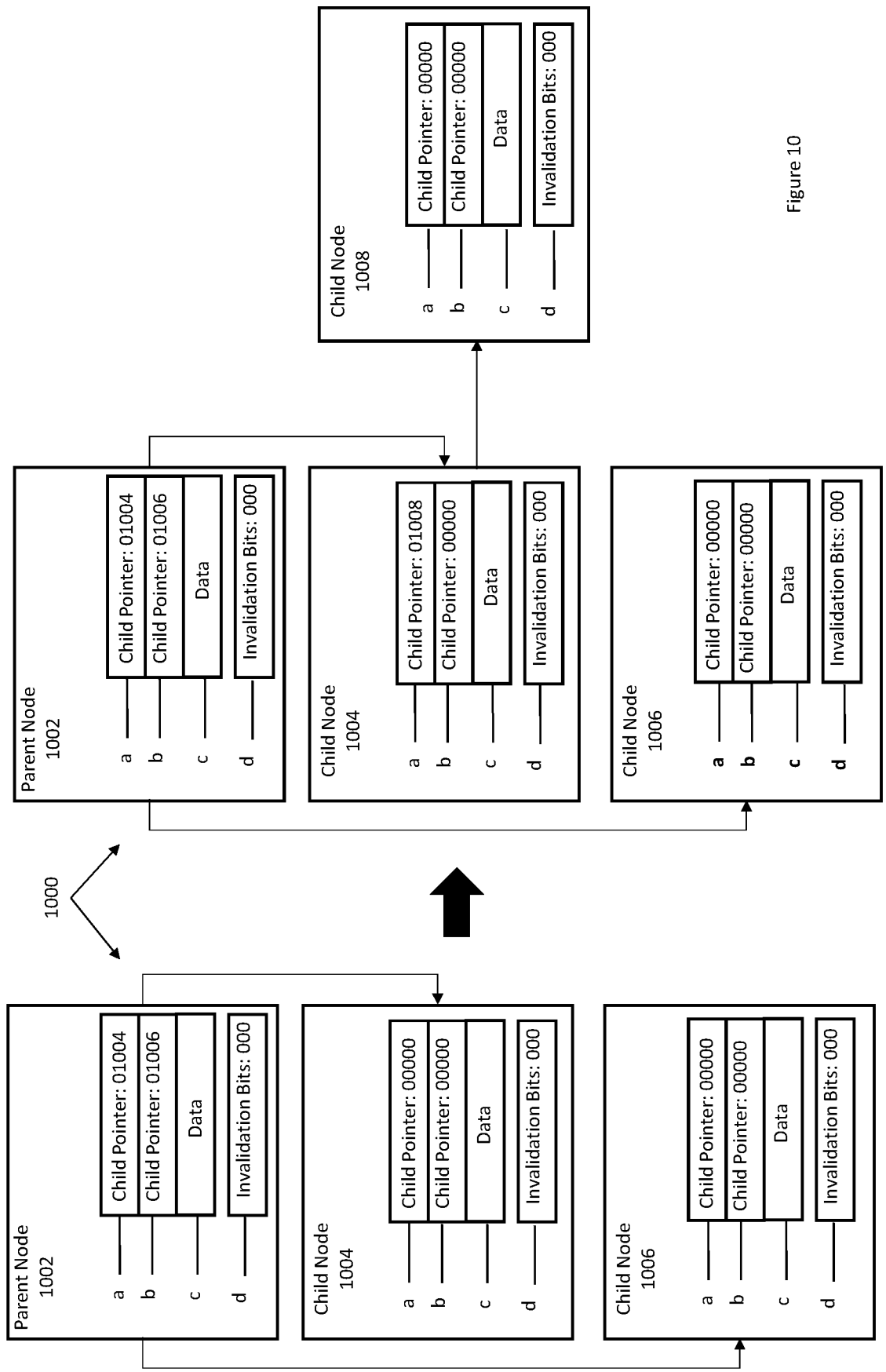
FIG. 10 illustrates an example of adding a new node in a data structure.

FIG. 10 illustrates an example of adding a node to a data structure such as a tree or graph. For description purposes, the sizes of the pointers and invalidation bits is shown to be small. However, the actual memory allocated to pointers and nodes may be substantially larger. Further, one of skill in the art can appreciate that nodes can be configured with different numbers of fields. For example, FIG. 10 illustrates that a node initially has two pointers or has space for two pointers. However, the nodes may be configured with space for fewer or more pointers. When rewritten, the space may be adapted to account for all pointers in the table in memory. The nodes illustrated in FIGS. 10-14 may be part of a tree or a graph. For convenience, the nodes may be discussed in terms of child/parent relationships. However, the nodes may also be connected nodes. Further, FIGS. 10-14 may refer to the same structure at different times. To provide clarity, however, the nodes may be referred to by different numbers. For example, FIG. 10 includes a node 1002. The same node in FIGS. 11, 12, 13, and 14 may be referred to, respectfully, as nodes 1102, 1202, 1302, and 1402.

FIG. 10 illustrates a data structure 1000 in two states. FIG. 10 illustrates an example of a process for adding a node to the structure 1000. The structure 1000 includes a parent node 1002 that is connected to a child node 1004 and a child node 1006. The pointer 1002a points to the node 1004 and the pointer 1002b points to the node 1006. The node 1002 also includes data 1002c and invalidation bits 1002d. In this example, there are three invalidation bits. The first may be used to invalidate the pointer 1002a, the second bit may be used to invalidate the pointer 1002b and the third bit may be used to invalidate the data 1002c (or a data pointer). Alternatively, the pointers or data could be invalidated by setting all bits therein to 1s. Space for invalidation bits may not be required in some examples. The nodes may also include a pointer array.

The node 1004 is similarly configured with a pointer 1004a, a pointer 1004b, data 1004c, and invalidation bits 1004d. The node 1006 includes a pointer 1006a, a pointer 1006b, data 1006c, and invalidation bits 1006d. The pointers 1004a, 1004b, 1006a, and 1006b, invalidation bits 1004d, and invalidation bits 1006d contain all zeros initially.

In FIG. 10 a child node 1008 is being added to the structure 1000. Because the child node 1004 is also a leaf node, the child node 1008 can be added in-place or to the tree without having to use the in-memory table. The pointer 1004a is overwritten with a "01008" value, which is a pointer to the node 1008. The pointer 1008a, the pointer 1008b, and the invalidation bits 1008d are initially zeros as illustrated in FIG. 10.

In this example, each node is provided with two child pointers. For example, if the node 1004 required a third (or more) child pointer, the third pointer would need to be temporarily stored in an in-memory table. When this table is written to the flash memory, the node 1004 would include three child pointers and the invalidation bits would include at least four entries.

Figure 11:
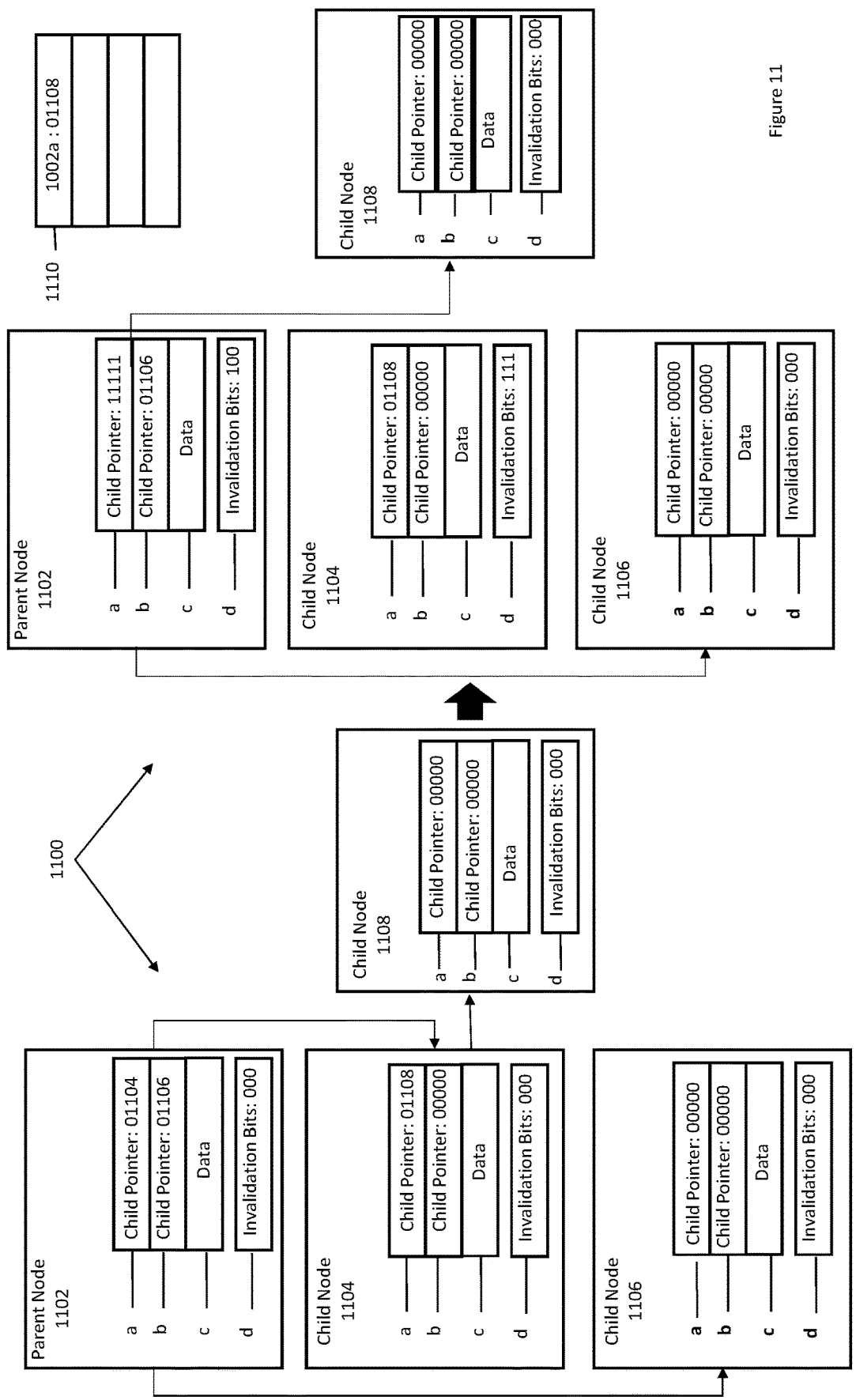
FIG. 11 illustrates an example of deleting a node in the data structure of FIG. 10.

FIG. 11 illustrates a structure 1100. The structure 1100 corresponds to the structure 1000 in FIG. 10 at a different time. FIG. 11 illustrates an example of the changes that may occur when the node 1104 is deleted from the structure 1100. In this example, an instruction to delete the node 1104 is received. This can be accomplished in multiple ways. FIG. 11 illustrates that the child pointer 1102a (which originally pointed to the node 1104 is invalidated. This can be accomplished by setting an invalidation bit as illustrated in the invalidation bits 1102d, which now reads 100. Alternatively, the child pointer 1102a can be invalidated by setting all the bits to 1s, as illustrated in the pointer 1102a.

The child pointer 1102b is still valid and points to the node 1106. Because there is no room for additional pointers in the node 1102, an entry is made in the table 1110. The entry in the table 1110 associates a child pointer with the node 1102, which child pointer points to the child node 1108. During traversal, the invalidity of the child pointer 1102a may cause the table 1110 to be examined. In this example, this leads to the node 1108.

Figure 12:
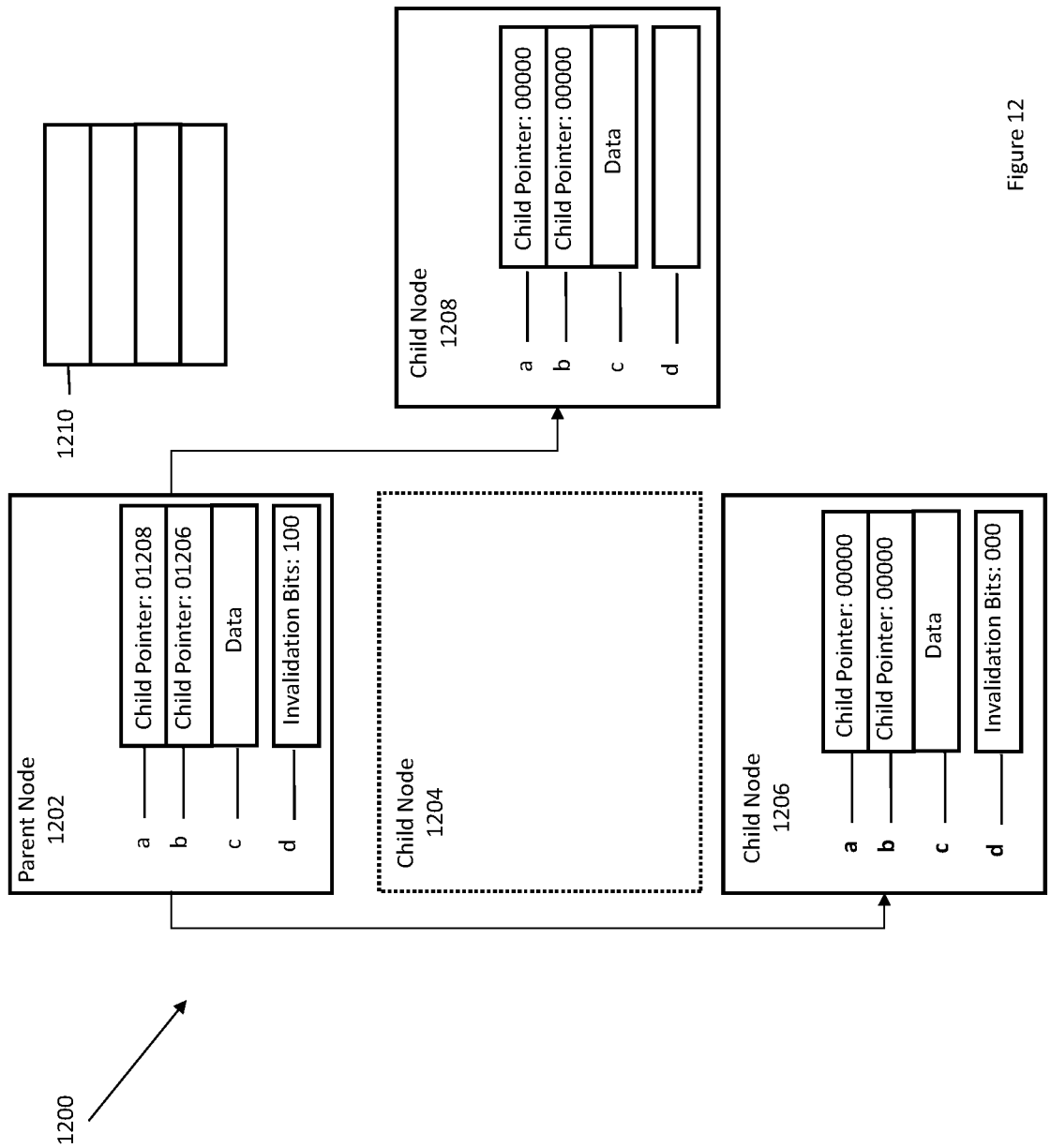
FIG. 12 illustrates an example of the data structure after flushing changes stored in memory to the data structure of FIG. 10.

FIG. 12 illustrates the structure 1200, which is the structure 1000 at a different time. In FIG. 12, the contents of the table 1210 are flushed to the flash memory or written out. The node 1204 is gone and marked for erasure if not erased. The table 1210 is empty (because the entry shown in the table 1110 has been flushed to the flash memory). The child pointer 1202a points to the node 1208.

Figure 13:
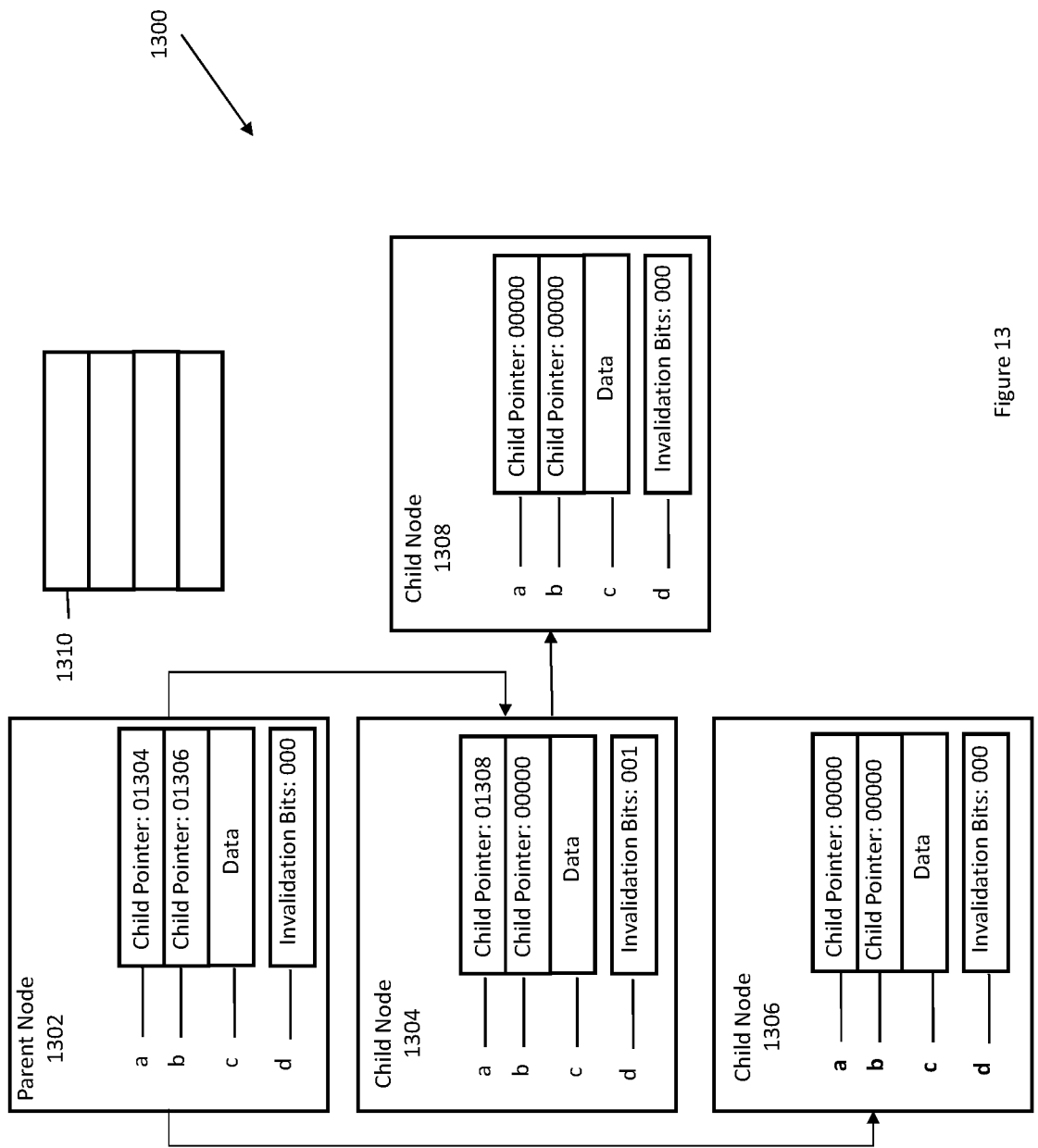
FIG. 13 illustrates another example of deleting a node from a data structure of FIG. 10.

FIG. 13 illustrates the structure 1300, which is the same as the structures 1000, 1100 and 1200 but is illustrated at a different time. FIG. 13 illustrates another example for deleting the child node 1004. In FIG. 13, the data 1304c is invalidated by setting the corresponding invalidation bit in the invalidation bits 1304d. Because the child pointer 1304a is valid, a traversal of the tree still arrives at the node 1308 by following the pointers in the nodes 1302 and 1304. The data of the child node 1304 is not considered because it is marked as invalid. In this example, no entry in the table 1310 is made.

Figure 14:
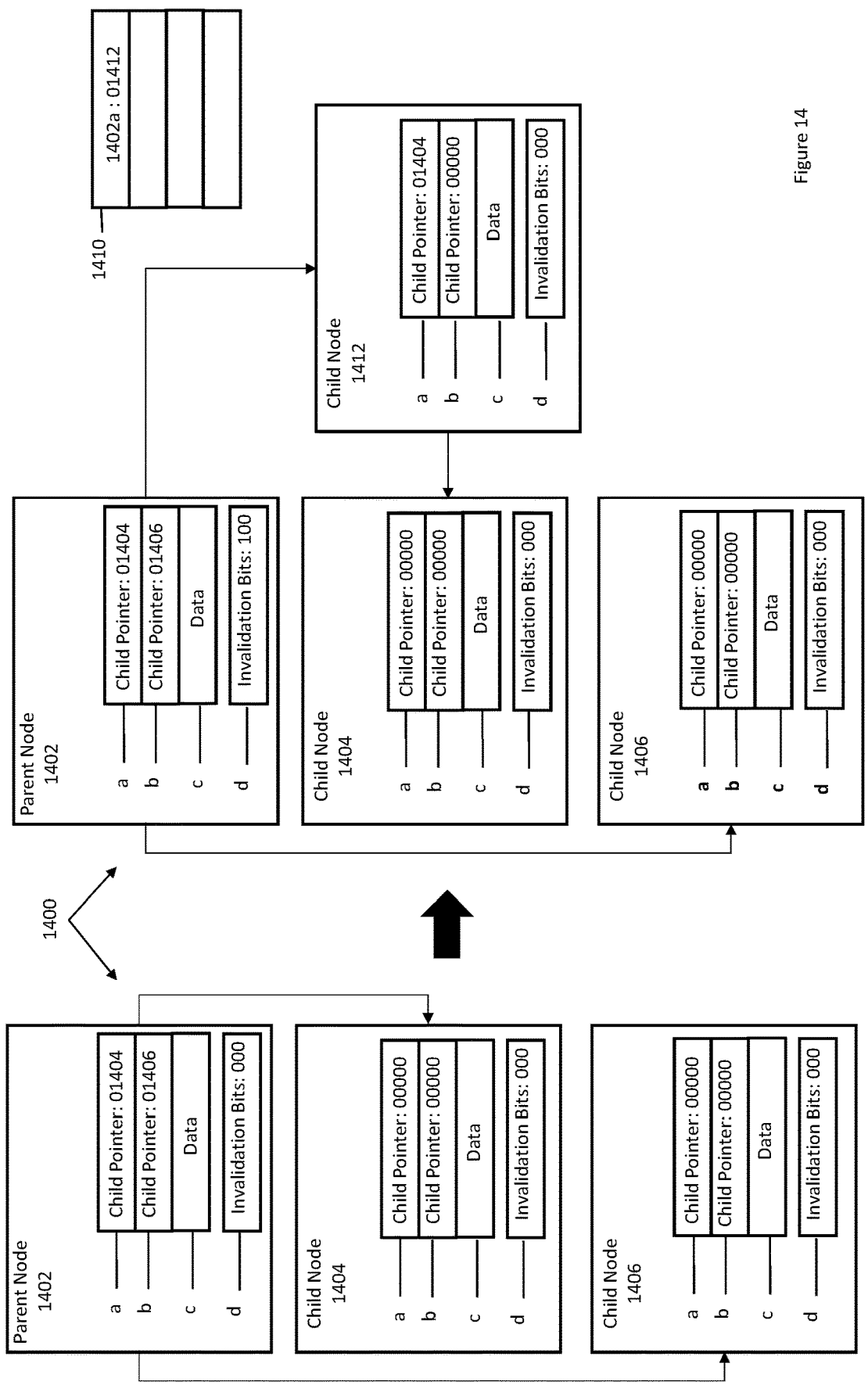
FIG. 14 illustrates an example of adding a node to the data structure of FIG. 10.

FIG. 14 illustrates the structure 1400, which corresponds to the data structure 1000 at a different time. FIG. 14 illustrates an example of inserting a node in between a parent node and a child node or inserting a node between two connected nodes. In this example, the node 1412 is added between the node 1402 and the node 1404. The node 1412 includes a pointer 1412a that points to the node 1404. The child pointer 1402a in invalidated by setting the corresponding invalidation bit in the invalidation bits 1402d. An entry is made in the table 1410 such that the node 1402 is associated with a child pointer to the node 1412.

In each of these examples, fields (e.g., pointers, invalidation bits, etc.) are updated by an overwrite process when possible. Overwrite operations, as discussed herein, refer to operations that set bits in the flash memory. Thus, a write command to existing data can be achieved by only setting some of the bits, then an overwrite operation may be performed. Thus, overwrite operations are performed when the proposed change only results in the setting of bits from 0s to 1s. If this is the case, the overwrite operation can be performed. If an overwrite operation cannot be performed on a pointer, then an appropriate bit in the invalidation bits is set and an entry in the in-memory table is made such that the structure can still be traversed. At some point, the changes in the table are written to the structure. When this occurs, the nodes are rewritten as needed.

A similar process is followed whether the structure 1000 (or 1100, 1200, 1300, or 1400) is a tree or a graph and whether the pointers are stored in the nodes themselves or in the edges. When making changes, all affected pointers are handled. In some examples, it may be necessary to make changes to parent and/or child pointers in one or more nodes. If the changes to the pointers cannot be achieved by an overwriting operation, then the changes may be reflected in an in-memory table.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, DRAM, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein. A controller may include a processor and memory and/or other computing chips.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for implementing a data structure in a flash memory, the method comprising:
   creating a data structure in a flash memory, wherein the data structure includes a parent node and a child node of the parent node;
   providing invalid bits and a child pointer in the parent node, wherein the invalid bits are initially all configured to be overwritten and wherein the child pointer in the parent node points to the child node, wherein the invalid bits of the parent node allow data or the child pointer in the parent node to be invalidated by overwriting a corresponding bit in the invalid bits of the parent node;
   providing invalid bits and a parent pointer in the child node, wherein the invalid bits and the child pointer in the child node are all initially configured to be overwritten, wherein the invalid bits of the child node allows data or the parent pointer in the child node to be invalidated by overwriting a corresponding bit in the invalid bits of the child node;
   performing an overwrite operation to change at least one of the parent node and the child node, wherein the flash memory includes an interface that allows a client to specify how to perform the overwrite operation.

2. The method of claim 1, further comprising changing at least one of the parent node and the child node with the overwrite operation by setting 0s to 1s when a portion being changed by the overwrite operation is amenable to the overwrite operation.

3. The method of claim 1, further comprising deleting at least one of the parent node and the child node.

4. The method of claim 3, wherein deleting the child node includes at least one of:
   invalidating the child pointer of the parent node by overwriting one of the invalid bits of the parent node that corresponds to the child pointer of the parent node;
   setting all bits of the child pointer to 1s; or
   invalidating only the data of the child node without invalidating the child pointer of the parent node such that the child node can be traversed without considering the data of the child node.

5. The method of claim 3, further comprising managing the child pointer of the parent node in a table in a memory that is separate from the flash memory when the overwrite operation cannot be performed.

6. The method of claim 1, further comprising adding a second child node to the parent node, wherein a child pointer to the second child node is written in an in memory table and associated with the parent node or wherein the parent node includes a second child pointer portion that is overwritten with the child pointer to the second child node.

7. The method of claim 1, wherein the overwrite operation includes setting invalidating bits for pointers than cannot be overwritten and writing new pointers to a table in a memory, wherein the new pointers are associated with nodes whose pointers were invalidated.

8. The method of claim 1, wherein the data structure comprises a tree data structure or a graph data structure.

9. The method of claim 1, wherein the data structure comprises nodes and edges, wherein the edges include pointers and a relationship, wherein the edges are included as fields in the nodes or wherein the edges are separate structures from the nodes, wherein the edges link connected nodes using pointers and relationships when the edges are separate structures, and wherein the pointers and relationships are included in the fields when the edges are part of the nodes.

10. The method of claim 1, wherein the overwrite operation includes performing a logical OR operation or a compare-and-swap operation, wherein a controller determines how to perform the overwrite operation is not specified by the client.

11. A method for implementing a data structure in a flash memory, the method comprising:
    creating a data structure in a flash memory, wherein the data structure includes a plurality of nodes;

providing invalid bits and at least one pointer in each of the nodes, wherein the invalid bits are initially configured to be overwritten and wherein at least one pointer points to at least one other node, wherein the invalid bits allows data and/or one or more of the at least one pointer to be invalidated by overwriting a corresponding bit in the invalid bits of the parent node; and performing an overwrite operation to change at least one of the nodes with an overwrite operation when a portion of the at least one of the nodes is amenable to the overwrite operation, wherein the flash memory includes a controller configured to perform the overwrite operation.

12. The method of claim 11, wherein the flash memory includes an interface that allows a client to specify how to perform the overwrite operation.

13. The method of claim 11, further comprising overwriting the at least one pointer, wherein the at least one pointer is invalidated by overwriting the invalid bits and wherein a new pointer is stored in an in-memory structure, wherein the new pointer in the in-memory structure is followed when traversing the data structure.

14. The method of claim 13, further comprising flushing the in-memory structure to the data structure.

15. The method of claim 11, further comprising at least one of:
deleting at least one of nodes;
adding a new node to the plurality of nodes;
changing at least a portion of at least one of the plurality of nodes with an overwrite operation.

16. The method of claim 11, further comprising storing the at least one pointers associated with the plurality of nodes in a table in a memory when the overwrite operation cannot be performed.

17. The method of claim 11, wherein the data structure comprises a tree data structure or a graph data structure.

18. The method of claim 11, the data structure comprises nodes and edges, wherein the edges include pointers and a relationship, wherein the edges are included as fields in the nodes or wherein the edges are separate structures from the nodes, wherein the edges link connected nodes using pointers and relationships when the edges are separate structures, and wherein the pointers and relationships are included in the fields when the edges are part of the nodes.

19. The method of claim 11, wherein the overwrite operation includes performing a logical OR operation or a compare-and-swap operation, wherein a controller determines how to perform the overwrite operation when the overwrite operation is not specified by the client.

20. A non-transitory computer readable medium comprising computer executable instructions configured to implement a method for implementing a data structure in a flash memory, the method comprising:
creating a data structure in a flash memory, wherein the data structure includes a plurality of nodes;
providing invalid bit and at least one pointer in each of the nodes, wherein the invalid bits are initially configured to be overwritten and wherein at least one pointer points to at least one other node, wherein the invalid bits allows data and/or one or more of the at least one pointer to be invalidated by overwriting a corresponding bit in the invalid bits of the parent node; and
performing an overwrite operation to change at least one of the nodes with an overwrite operations when a portion of the at least one of the nodes in amendable to the overwrite operation.

* * * * *